United States Patent
Ellsworth et al.

(10) Patent No.: US 6,598,543 B1
(45) Date of Patent: Jul. 29, 2003

(54) FOLD-UP INDOOR TABLE

(75) Inventors: Arthur W. Ellsworth, Orange, CA (US); Dennis L. Grudt, Long Beach, CA (US); David M. Hines, Santa Ana, CA (US); Gilbert F. Wenck, Newport Beach, CA (US)

(73) Assignee: Meco Corporation, Greenville, TN (US)

( * ) Notice: Subject to any disclaimer, the term of this patent is extended or adjusted under 35 U.S.C. 154(b) by 0 days.

(21) Appl. No.: 09/974,785

(22) Filed: Oct. 4, 2001

Related U.S. Application Data

(60) Provisional application No. 60/238,083, filed on Oct. 4, 2000.

(51) Int. Cl.[7] ................................................. A47B 3/00
(52) U.S. Cl. ......................................................... 108/115
(58) Field of Search ................................. 108/115, 124, 108/162, 176, 169, 164, 134, 175, 159

(56) References Cited

U.S. PATENT DOCUMENTS

| | | | | |
|---|---|---|---|---|
| 148,611 A | * | 3/1874 | Horton | |
| 490,320 A | * | 1/1893 | Smyth | |
| 2,057,334 A | * | 10/1936 | Hannum | |
| 3,124,085 A | * | 3/1964 | Sanchez | |
| 4,997,151 A | * | 3/1991 | Pai | |
| 5,562,050 A | * | 10/1996 | Colquhoun | |

FOREIGN PATENT DOCUMENTS

JP           11-343685           * 12/1999

* cited by examiner

Primary Examiner—Jose V. Chen
(74) Attorney, Agent, or Firm—McGuireWoods LLP

(57) ABSTRACT

A stylish fold-up table has pivoting leg assemblies mounted to the underside of opposing ends of a table top. Pivoting skirts are mounted to the underside of opposing sides of the table top. The leg assemblies are erected and the side skirts are then folded down. Latches on the side skirts then engage latch receiving elements on the leg assemblies to secure the table in an erect position. In a preferred embodiment, this arrangement allows for a storable fold-up table in which all mounting hardware is hidden when erected.

3 Claims, 3 Drawing Sheets

FOLD-UP INDOOR TABLE

RELATIONSHIP TO PRIOR APPLICATIONS

This application claims the benefit of Provisional Application Serial No. 60/238,083, filed Oct. 4, 2000, and incorporated herein in its entirety.

FIELD OF THE INVENTION

The present invention is drawn to an apparatus and method for providing storable indoor tables. More particularly, it is directed to providing stylish, rack-free tables that can be stored by folding.

BACKGROUND INFORMATION

Card tables are normally 30" to 38" square or 40" round. They are soft vinyl covered and lightweight. They are also flimsy and prone to excessive racking and appear cheap and old fashioned. Banquet tables are normally 30" wide and available in lengths ranging from 5' to 8'. Some fold in the center. All are supposed to be storable. However they are heavy and awkward and have an industrial appearance.

Card tables range in price from $25 to over $100. Banquet tables can be found in the same price range and more.

BRIEF SUMMARY OF THE INVENTION

The table of the present invention is intended for temporary dinning, entertaining, and meetings, but is attractive enough to serve as semi-permanent furniture. A preferred embodiment is a folding version that incorporates a unique leg device that ensures stability.

It is an object of the invention to provide a storable indoor table that is rack free and stylish.

It is an object of the invention to provide a 36"×48" dining height (30") storable indoor table that is rack free and stylish.

It is a further object of the invention to provide a new category of temporary tables that fall between a traditional card table and a traditional banquet table.

It is another object of the invention to provide a folding table that can be both fixed in size and expandable.

DETAILED DESCRIPTION OF THE INVENTION

Figure 1:
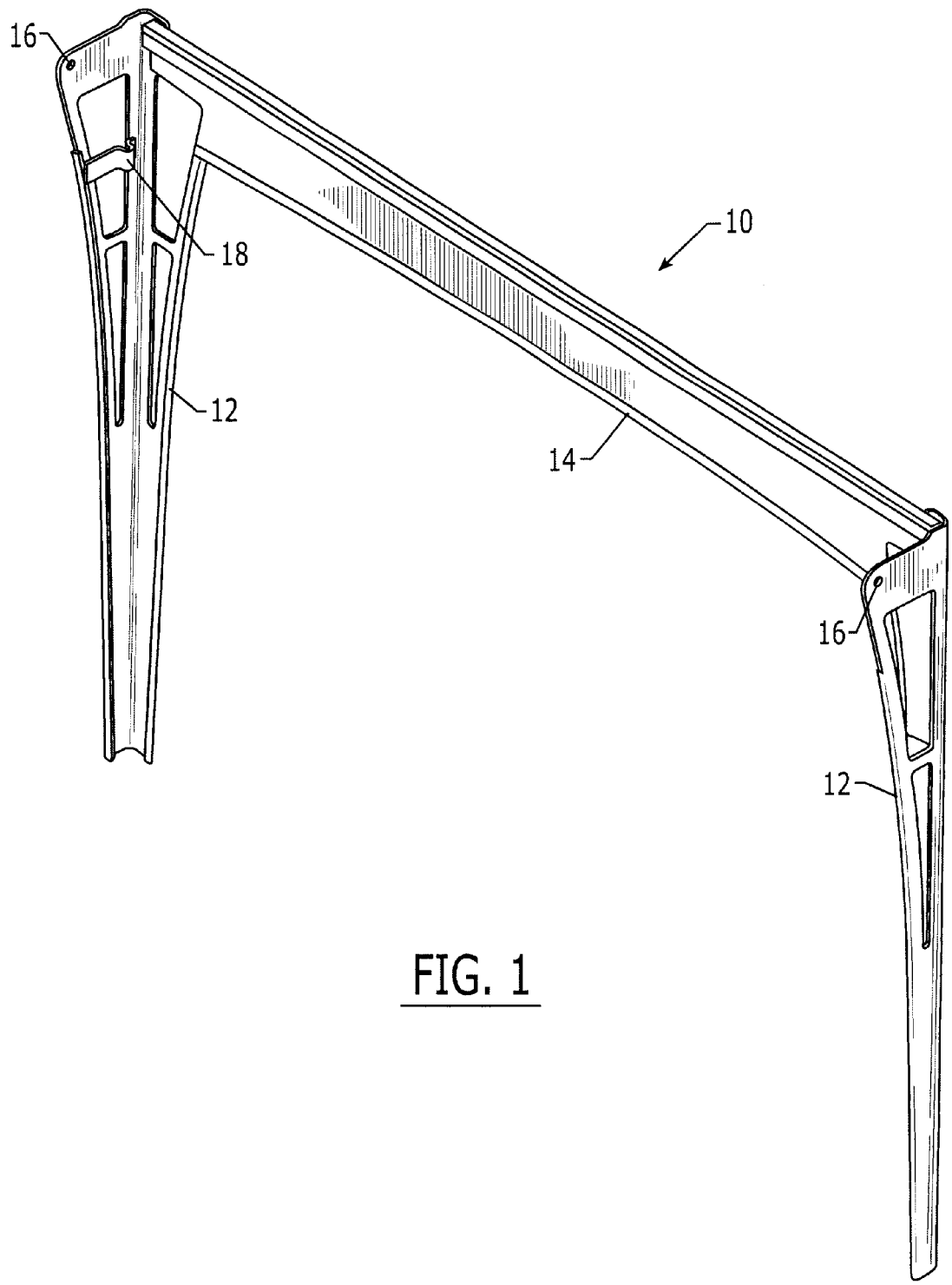
FIG. 1 illustrates a leg assembly the present invention.

The present invention is drawn to the provision of stylish, rack-free tables, as typically used indoors. In a preferred embodiment, as shown in FIG. 1, a pivoting assembly 10 composed of two legs 12 with a skirt section 14 therebetween is pivotally attached, by the interface of pivot holes 16 with special brackets (see FIG. 3), to either end of the tabletop. Latch-receiving elements 18 are located at an upper inside portion of legs 12 below pivot holes 16. Opposing assemblies 10 should preferably be dimensioned so that one is slightly narrower than the other, so as to provide that it fits within the other assembly when they are folded.

Figure 2A:
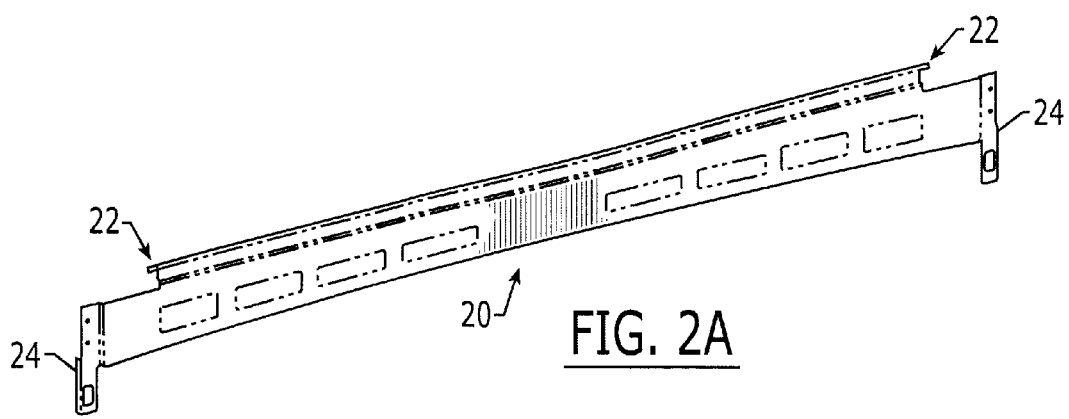
FIG. 2A illustrates a pivoting skirt of the present invention.

As illustrated in FIG. 2A, a pair of pivoting skirts 20 are dimensioned to span the length of the tabletop between the two ends. Rods 22 on either side of a top edge of skirt 20 interface with special brackets (see FIG. 3) so as to allow the skirts 20 to pivot upwardly to fold flat against a bottom surface of the tabletop when in a folded configuration and pivot downwardly for assembly into an erected table configuration. Latch assemblies 24 are positioned at either end of the skirt 20 in a position to engage a portion a latch-receiving element 18 of the leg assemblies 10 when erected.

Figure 2B:
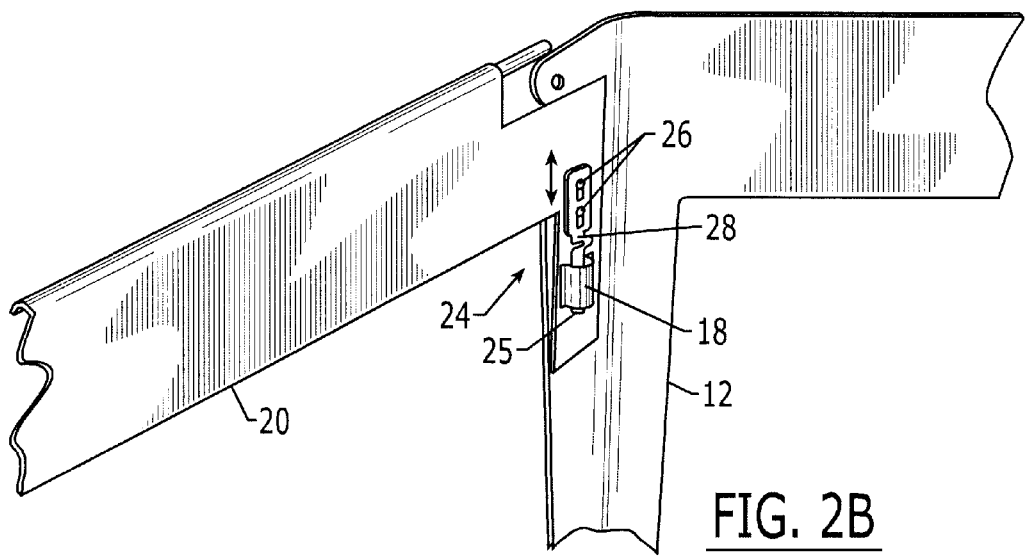
FIG. 2B illustrates a latch assembly of a pivoting skirt of the present invention.

In a preferred embodiment, as shown in FIG. 2B, the latch assembly 24 includes an opening 25 for receiving latch-receiving element 18 from leg 12 and a pair of mounting means 26 for slidingly mounting a latch 28 into latch-receiving element 18.

Figure 3:
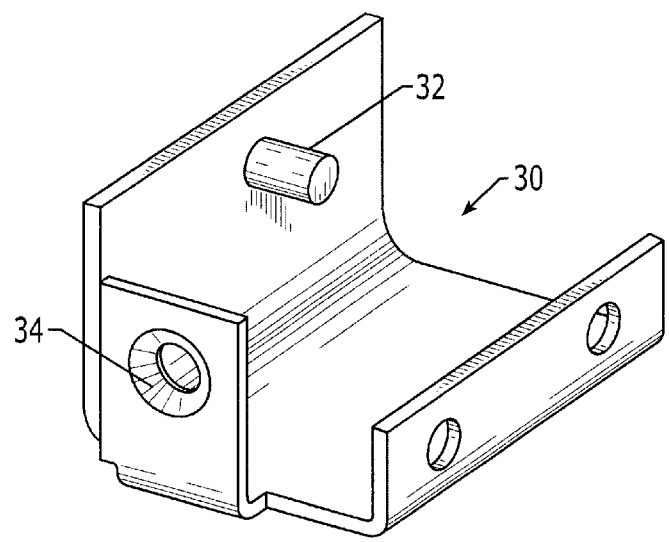
FIG. 3 illustrates a special bracket of the present invention.

Special brackets 30 are illustrated in FIG. 3, and are mounted to the bottom of the tabletop in each corner. Each bracket 30 includes a rod portion 32 for pivotally mounting to holes 16 of leg assemblies 10 and a mounting hole 34 for engaging rods 22 from the pivoting skirts 20.

Figure 4:
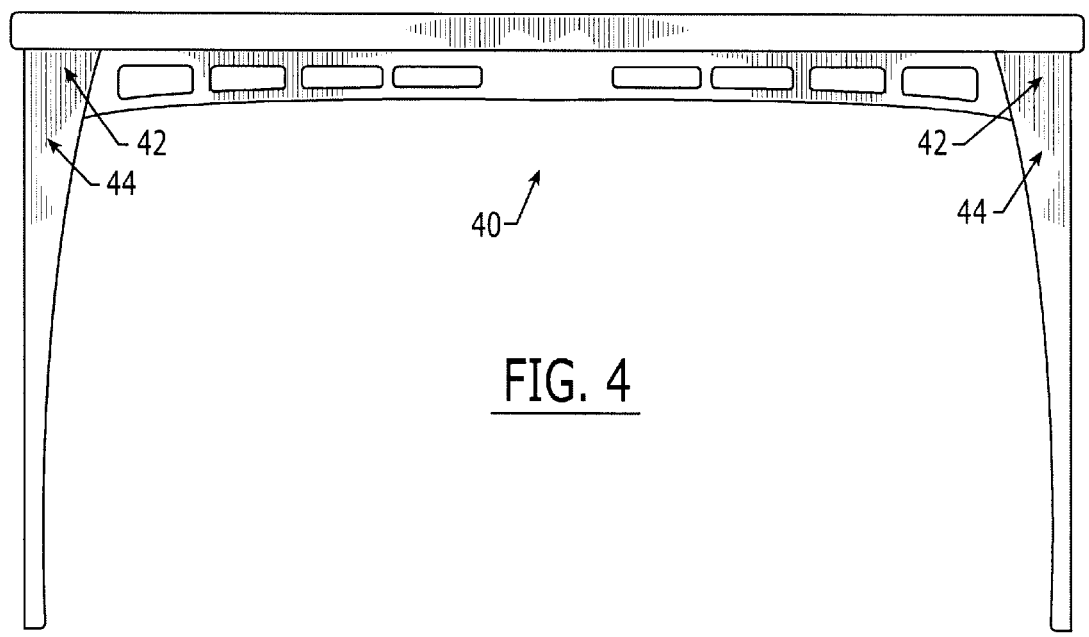
FIG. 4 illustrates the present invention in an erected state.

FIG. 4 illustrates the folded table embodiment in an erected state 40, wherein hidden pivots 42 and hidden latches 44 provide a stylish looking table.

Upon releasing the latch assemblies 24, the skirts 20 can be folded flat against the underside of the tabletop. Each leg assembly 10 can then be folded inwardly toward the underside of the tabletop to allow compact storage of the table.

Although disclosed in a particular design, numerous other useful and/or stylish designs can incorporate the present invention.

The legs and frame pieces of the present invention can be made using various materials, including plastic, wood, aluminum, cast aluminum, sheet metal, machined steel, or any other appropriate materials. The tabletops can also use these materials, as well as stone, glass, etc., as appropriate.

We claim:

1. A fold-up table, comprising:
   a table top having an upper surface, a lower surface, two sides, and two ends;
   two pairs of mounting brackets located adjacent corners of each end on the underside of said tabletop, each bracket including a pivot rod and a pivot hole;
   two pivotable leg assemblies; and
   two pivotable side skirts;
   wherein each leg assembly comprises an end skirt and two parallel legs extending from either end of said end skirt, wherein each leg further includes:
     a visible outer surface;
     an inner surface;
     a pivot hole at an upper portion thereof for attaching to the pivot rod of said mounting brackets to attach the leg assembly to an end of said table top; and
     a latch receiving means on an upper portion of said inner surface; and wherein each side skirt includes:
     a pivot rod at an upper portion of each end for attaching to the pivot holes of said mounting brackets at opposing ends of the side skirt to attach the side skirt to a side of said table top; and
     a latch at a lower portion of each end, said latch positioned for engaging said latch receiving means on said legs of each leg assembly when said fold-up table is in an erect position.

2. The fold-up table of claim 1, wherein said latches are sliding latches.

3. The fold-up table of claim 1, wherein said leg assemblies and said skirt are formed of metel.

* * * * *